(12) United States Patent
Takamoto

(10) Patent No.: US 9,135,534 B2
(45) Date of Patent: Sep. 15, 2015

(54) IMAGE PROCESSING DEVICE, IMAGE PROCESSING SYSTEM, AND PRINTING METHOD

(71) Applicant: SEIKO EPSON CORPORATION, Tokyo (JP)

(72) Inventor: Akio Takamoto, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 106 days.

(21) Appl. No.: 13/922,906

(22) Filed: Jun. 20, 2013

(65) Prior Publication Data

US 2013/0342854 A1 Dec. 26, 2013

(30) Foreign Application Priority Data

Jun. 21, 2012 (JP) ................................ 2012-139501
Sep. 7, 2012 (JP) ................................ 2012-197521

(51) Int. Cl.
*G06K 15/02* (2006.01)
*G06F 3/12* (2006.01)

(52) U.S. Cl.
CPC .......... *G06K 15/1822* (2013.01); *G06F 3/1208* (2013.01); *G06F 3/1247* (2013.01); *G06F 3/1284* (2013.01)

(58) Field of Classification Search
CPC ............ G06K 15/1822; G06K 7/1443; G06K 7/1452; G06K 7/1456; H04N 1/00363; H04N 1/00968; H04N 1/32133; H04N 2201/212; H04N 2201/3269; G06F 3/1208; G06F 3/1247; G06F 3/1284

USPC .................................................. 358/1.15, 1.1
See application file for complete search history.

(56) References Cited

U.S. PATENT DOCUMENTS 5,269,226 A  12/1993  Theurer et al.
2003/0208560 A1  11/2003  Inoue et al.

FOREIGN PATENT DOCUMENTS

| EP | 1603080 A2 | 12/2005 |
|---|---|---|
| EP | 2434390 A2 | 3/2012 |
| JP | 05-202504 A | 8/1993 |
| JP | 11-007484 A | 1/1999 |
| JP | 11-265419 A | 9/1999 |
| JP | 2003-048339 A | 2/2003 |
| JP | 2003-251863 A | 9/2003 |
| JP | 200631427 A | 2/2006 |
| JP | 200847076 A | 2/2008 |
| JP | 201176359 A | 4/2011 |

(Continued)

OTHER PUBLICATIONS

Akiba, Printer Driver, Print Control Method, and Printer System, Apr. 14, 2011, JP 2011076359 A.*

(Continued)

*Primary Examiner* — Martin Mushambo
(74) *Attorney, Agent, or Firm* — Lowe Hauptman & Ham, LLP

(57) ABSTRACT

A printer driver 12 has an image data acquisition unit 120 that acquires first image data containing a symbol image or text information at a first resolution, an analyzer 130 that analyzes the symbol image or text information, and an image data generator 160 that generates second image data containing a symbol image or text information at a second resolution based on the result from the analyzer 130.

15 Claims, 12 Drawing Sheets

(56) References Cited

FOREIGN PATENT DOCUMENTS

| JP | 201184039 A | 4/2011 |
|---|---|---|
| JP | 2012111216 A | 6/2012 |

OTHER PUBLICATIONS

Extended European Search Report issued Apr. 22, 2014, corresponds to European patent application No. 13172202.7.

* cited by examiner

180[dpi] / 512[dot]          360[dpi] / 752[dot]

IMAGE PROCESSING DEVICE, IMAGE PROCESSING SYSTEM, AND PRINTING METHOD

RELATED APPLICATIONS

The present application is based on, and claims priority from, Japanese Application Number 2012-139501, filed Jun. 21, 2012, and Japanese Application Number 2012-197521, filed Sep. 7, 2012, the disclosures of which are hereby incorporated by reference herein in their entirety.

BACKGROUND

1. Technical Field

The present invention relates to an image processing device that enlarges or reduces image data according to the resolution of a printer, to an image processing system, and to a printing method.

2. Related Art

Japanese Unexamined Patent Appl. Pub. JP-A-2003-251863 discloses technology for solving problems related to replacing a printer with a printer having a different print resolution (pixel density). JP-A-2003-251863 relates to a printer with a function for analyzing a barcode print command sent from a host device and producing a barcode image, and prevents shrinking or stretching the barcode due to differences in printer engine characteristics, resolution, and paper feed direction, for example, by enabling the operator to input a barcode scaling (enlargement/reduction) ratio.

However, the host (application) may send image data for a barcode symbol instead of sending a barcode print command in order to print a barcode. If in this event the print resolution anticipated by the host and the resolution of the printer differ (because the printer was replaced, for example), the barcode may be enlarged or reduced by the printer driver or the printer, possibly resulting in distortion of the barcode image and being unable to read the barcode normally with a barcode reader. For example, if a 300 dpi barcode image is printed on a 360 dpi printer and the image width is adjusted according to the paper, barcode precision drops by the process of enlarging the image data from 300 dpi to 360 dpi. If the image is printed without adjusting the image width, the spacing between the bars will be distorted because the dot size differs. Substituting a printer with a different resolution also affects the print quality of text (characters) as well as barcode images.

This problem can be solved by modifying the application to generate image data with barcode or text information matching the printer resolution, but changing the application is expensive and therefore not a practical solution.

SUMMARY

The present invention is directed to solving the foregoing problem, and provides an image processing device, an image processing system, and a printing method that can maintain the print quality of a symbol image or text without needing to modify the application even when a printer with a different printer resolution is substituted.

An image processing device according to one aspect of the invention has an image data acquisition unit that acquires first image data including a symbol image of a first resolution; an analyzer that analyzes the symbol image; and an image data generating unit that generates second image data containing a symbol image of a second resolution based on the result of analysis by the analyzer.

Preferably, the first image data contains text information; the analyzer analyzes the text information; and the image data generating unit generates the second image data containing text information at the second resolution.

Another aspect of the invention is an image processing system including: an image data output device that outputs first image data including a symbol image of a first resolution; and an image processing device including an image data acquisition unit that acquires the first image data, an analyzer that analyzes the symbol image, an image data generating unit that generates second image data containing the symbol image at a second resolution based on the result of analysis by the analyzer, and an output unit that transmits the second image data generated by the image data generating unit.

Preferably, the image processing system also includes a printer having a receiving unit that receives the second image data transmitted from the output unit of the image processing device, a printhead that prints at the second resolution, and a control unit that causes the printhead to print the second image data received by the receiving unit.

Further preferably, the first image data contains text information; the analyzer of the image processing device analyzes the text information; and the image data generating unit of the image processing device generates the second image data containing text information at the second resolution.

Another aspect of the invention is a printing method including steps of: generating first image data including a symbol image of a first resolution; analyzing the symbol image contained in the generated first image data; generating second image data containing the symbol image at a second resolution based on the result of the analysis; and printing the generated second image data generated at the second resolution.

Preferably, the first image data contains text information; and the printing method further includes analyzing the text information; and generating the second image data containing text information at the second resolution.

The invention analyzes a symbol image (such as a barcode image) or text information at a first resolution, and based on the result of this analysis converts to a symbol image or text information at a second resolution. As a result, if the resolution (first resolution) of a first (old) printer, and the resolution (second resolution) of a replacement (new) printer differ, the print quality of the symbol image or text can be maintained without changing the application. More specifically, if an image or text is simply scaled according to the resolution of the replacement printer, the barcode image may become distorted and unreadable, or the text may become too small or deformed. However, the invention prevents this problem by first analyzing the print image data and converting appropriately to a barcode image or text at a second resolution.

Note that a symbol image denotes a coded image of information, such as a linear barcode, a 2D code, or a color barcode symbol.

Analyzing text information could use OCR (optical character recognition) technology, for example.

In a printing system having a host and a printer, the image processing device could be embodied on the host side or the printer side. If on the host side, the image processing device could be rendered as a printer driver.

A symbol image or text information at the second resolution could be image data for the symbol image or text at the second resolution. In this configuration, the image processing device can generate second image data containing image data for the symbol image or text at the second resolution.

An image processing device according to another aspect of the invention also has a print command generating unit that generates a print command to print a symbol image at the second resolution based on the result of analysis by the analyzer.

The image processing device according to this aspect of the invention can generate a print command that causes a printer to print a symbol image or text at the second resolution. In this embodiment, the image processing device is embodied as a printer driver on the host side.

In an image processing device according to another aspect of the invention, the first image data contains a symbol image at a first resolution; the image processing device also has a printing position controller that specifies a printing position of the symbol image at the second resolution of the second image data; and the image data generating unit generates the second image data according to the printing position specified by the printing position controller.

Because this aspect of the invention can specify where to print (where image data for the symbol image, or a print command, is inserted) information in the symbol image, the appearance of the printout will not be degraded when the printing area of the symbol image is enlarged or reduced by scaling image data based on differences in resolution (a process based on a user-specified scaling ratio), or the actual printed size differs because the image data is not enlarged or reduced.

An image processing device according to another aspect of the invention preferably also has a resolution setting unit where the first resolution is set; the image data generating unit enlarging or reducing the first image data based on the second resolution and the first resolution set by the resolution setting unit, and setting a printing position for symbol image information at the second resolution in the second image data based on the location of a symbol image at the first resolution in the first image data that is enlarged or reduced.

By specifying the first resolution, this aspect of the invention can accurately scale image data according to differences in the first resolution and second resolution. The printing position of the symbol image in the second image data (where the symbol image or print command is inserted) can therefore be set appropriately according to the location of the symbol image after scaling is completed.

In an image processing device according to another aspect of the invention, the first image data contains information related to the printing paper size; and the image data generating unit enlarges or reduces the first image data based on the information related to the printing paper size.

This aspect of the invention can desirably scale image data so that the second image data is printed at a size appropriate to the paper size information added to the first image data.

An image processing device according to another aspect of the invention also has a logo image data storage unit that stores logo image data of a different resolution than the first resolution; and a logo analyzer that determines if logo image data is contained in the first image data; wherein when the logo analyzer determines logo image data is contained in the first image data, the image data generating unit replaces the logo image data in the first image data with logo image data stored in the logo image data storage unit, and generates the second image data.

In an image processing device according to another aspect of the invention, the image data generating unit converts the logo image data stored in the logo image data storage unit to logo image data at the second resolution, and replaces logo image data in the first image data with the logo image data of the second resolution.

This aspect of the invention can prevent a loss of print quality in the logo image when a logo image is included in the first image data by converting the logo image to a logo image at the second resolution.

The logo analyzer could analyze the image data using pattern matching technology, for example. In this configuration, the analyzer compares the logo image data with logo image data stored in the logo image data storage unit.

In an image processing device according to another aspect of the invention, the first image data acquired by the image data acquisition unit is image data of the first resolution in a first direction that is printed on recording paper of a first width in the first direction; and when the second image data generated by the image data generating unit is printed on recording paper of a second width that differs from the first width in the first direction, the image data generating unit generates the second image data based on the second width.

This aspect of the invention has the same effect when the number of dots and width of the recording paper used by the old (former) and new (replacement) printers differ, and not only when the printer resolutions differ. For example, when replacing a printer that records 512 dots per line on the recording paper with a printer that records 752 dots widthwise, a printout with a good appearance matching the actual paper width can be achieved by the image processing device enlarging the image data approximately 1.46 times, but this scaling process can lower the print quality of the symbol image or text. However, using the invention in this scenario to absorb differences in the width of paper used by the before and after printers can prevent a loss of print quality even when the image processing device enlarges or reduces the image data.

Further preferably, the image data generating unit generates third image data that is different from the second image data based on the result of the analyzer analyzing the text information.

This aspect of the invention generates third image data with the image processing device, and can therefore be used to add a function for adding coupon data to the receipt data generated by an application, for example.

This third image data is not limited to coupon data and could be data for a gift receipt, a product warranty, a certificate of quality, advertising, or other object.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 10A and 10B show sample printouts before and after printer replacement in the fourth embodiment of the invention.

DESCRIPTION OF EMBODIMENTS

Preferred embodiments of an image processing device, image processing system, and printing method according to the present invention are described below with reference to the accompanying figures. Note that the first to third embodiments describe printing barcodes (symbol images), and the fourth to sixth embodiments describe printing text.

Embodiment 1

Figure 1:
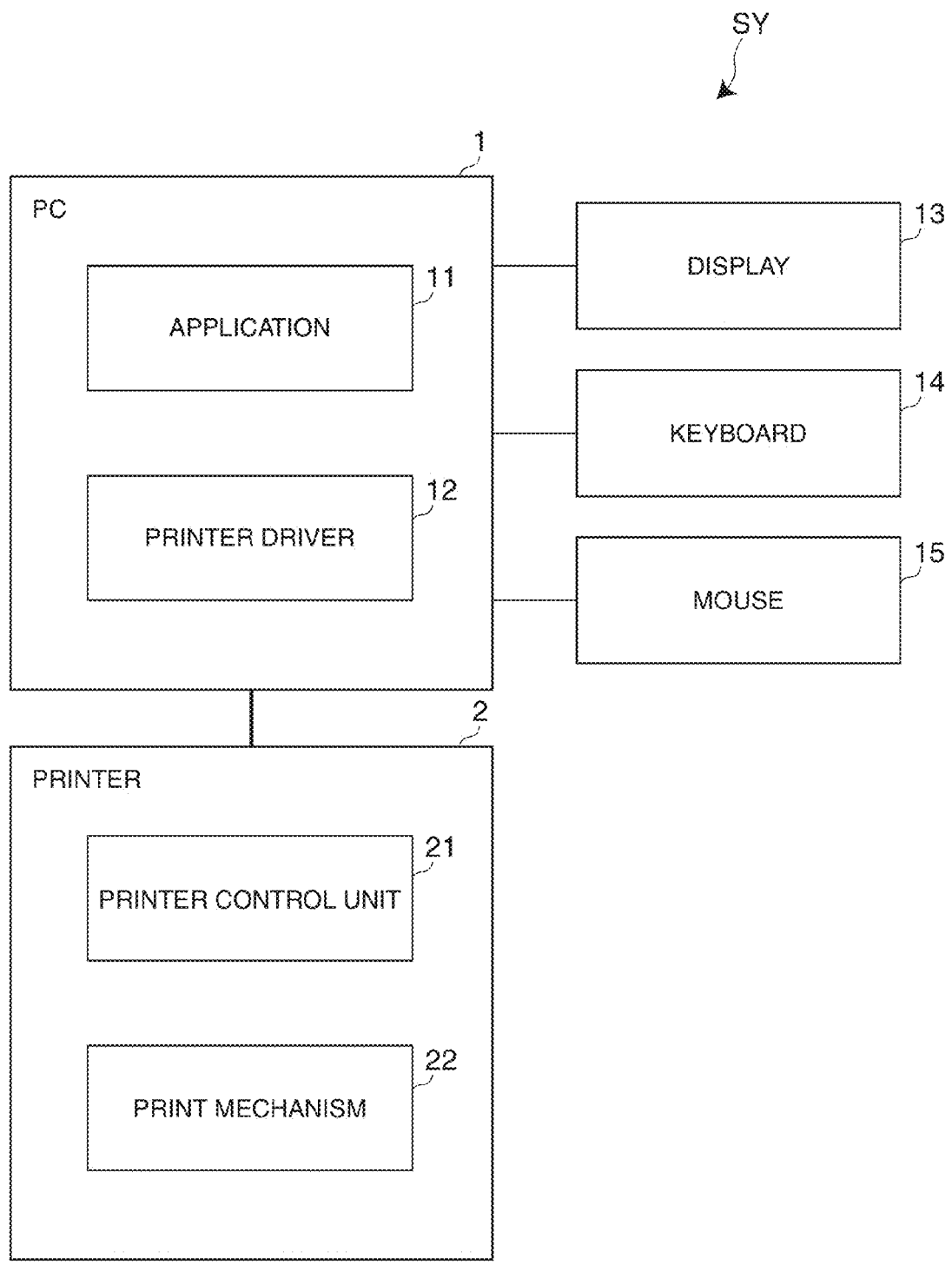
FIG. 1 is a block diagram of a printing system according to a first embodiment of the invention.

The first embodiment describes embodying the image processing device of the invention as a printer driver. FIG. 1 is a block diagram of a printing system SY (image processing system). This printing system SY includes a personal computer (PC) 1 as a host device, and a printer 2 that prints based on a print command from the PC 1. The PC 1 and network. printer 2 are connected directly by a cable or through a LAN or other The PC 1 has an application 11 that generates image data for a specific resolution and paper (dot count and length in the paper width and conveyance directions), a printer driver 12 for the printer 2, a display 13 that displays information including the image to be printed, and a keyboard 14 and mouse 15 for inputting information. The application 11 in this example is a report application used in a medical facility, and can generate barcode images (symbol images).

The printer 2 has a printer control unit 21 (control unit) that controls data input/output with the PC 1, printing, and other processes, and a print mechanism 22 including a printhead and paper feed mechanism.

The printer 2 in this embodiment is a 360 dpi printer that replaces an older 300 dpi printer. The application 11 generates image data for the old 300 dpi printer, and barcode image data (information for a symbol image) is contained in the generated image data. The print quality of the barcode image is degraded when printed at a different resolution in this system. As a result, the printer driver 12 absorbs the difference in resolution and maintains the print quality of the barcode image.

Figure 2:
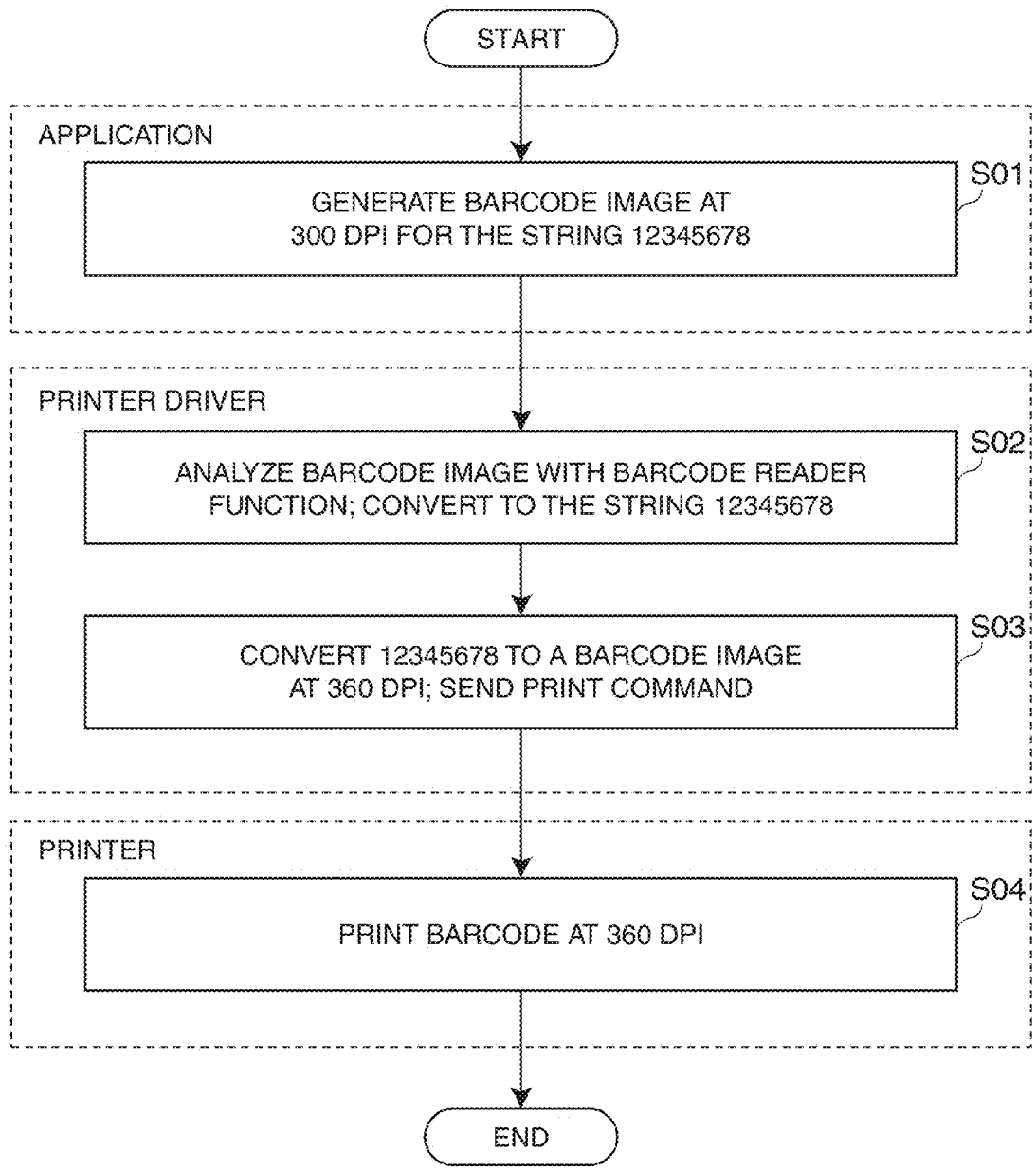
FIG. 2 is a flow chart of a printing process in the first embodiment.

FIG. 2 is a basic flow chart showing the general flow of operations in the printing process according to the first embodiment of the invention.

The application 11 first generates a barcode image representing the numeric string 12345678, for example, at 300 dpi (S01). Next, the printer driver 12 analyzes and converts the barcode image to the numbers 12345678 using a barcode reader function (S02). The printer driver 12 then converts the numbers 12345678 to a barcode image at the 360 dpi resolution of the new printer 2, and outputs a print command to the printer 2 (S03). The printer 2 then prints a 360 dpi barcode image on the designated printing paper according to the print command (S04).

Figure 4A:
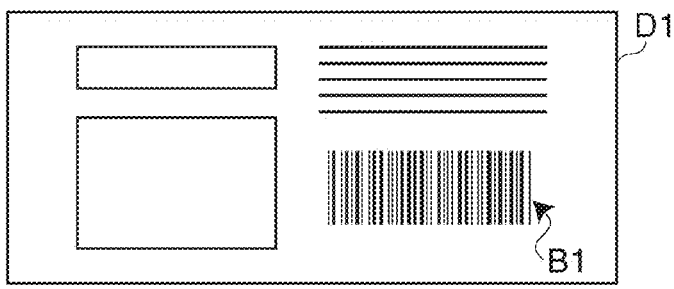
FIGS. 4A, 4B, 4C and 4D describe setting the printing position of a barcode image.

Note that instead of generating only a barcode image, the application 11 actually generates image data (D1) of which the barcode image (B1) is part as shown in FIG. 4A. The printer driver 12 then determines if a barcode image is contained in the acquired image data, and runs the process shown in FIG. 2 if a barcode image is found.

Figure 3:
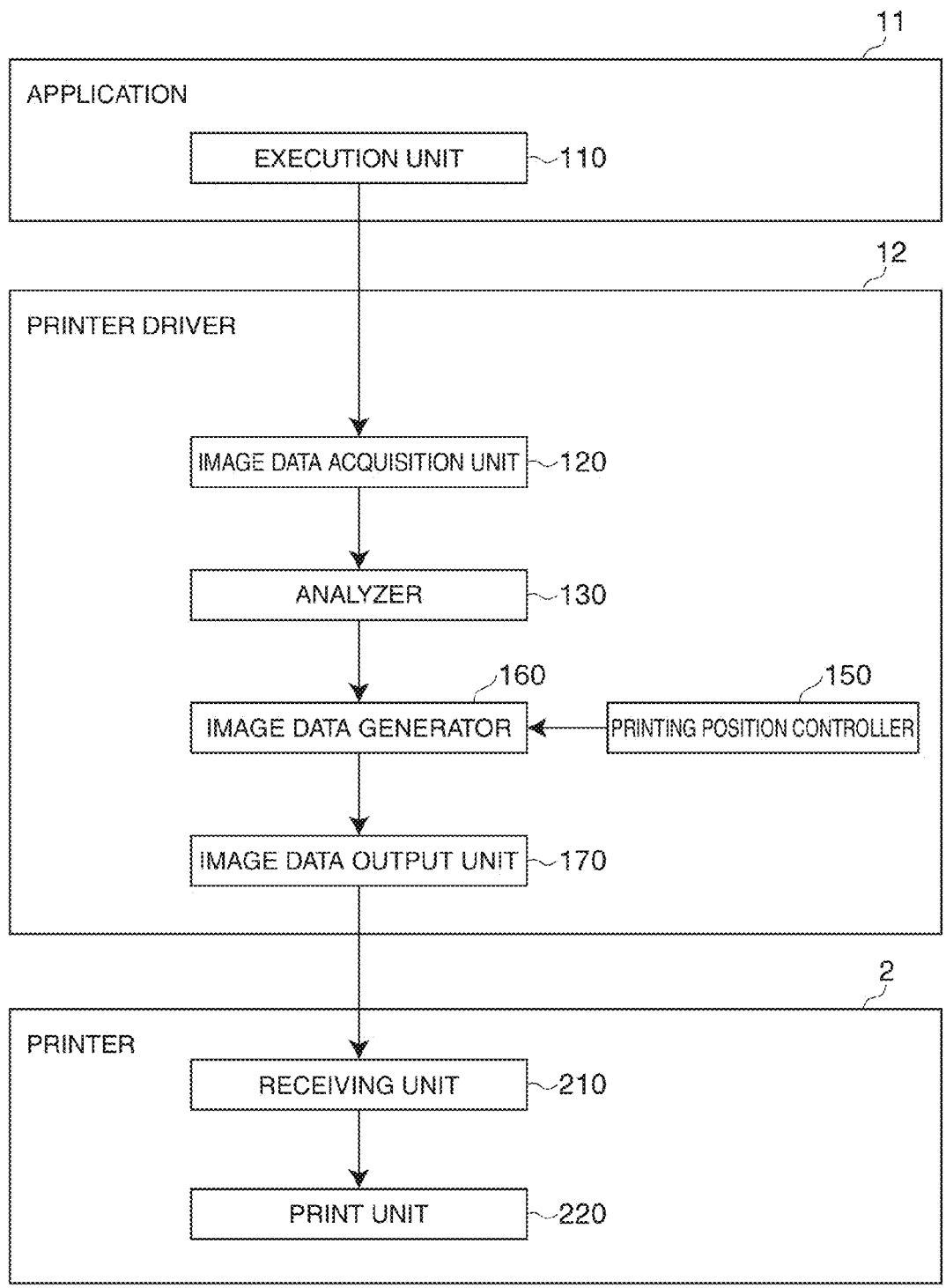
FIG. 3 is a function block diagram of the printing system according to the first embodiment of the invention.

The functional configuration of the printing system SY is described next with reference to FIG. 3. The main functional component of the application 11 is an execution unit 110. The execution unit 110 is the application 11 execution environment.

The main functional components of the printer driver 12 are an image data acquisition unit 120, analyzer 130, printing position controller 150, image data generator 160, and image data output unit 170.

The image data acquisition unit 120 acquires first image data containing image data for the barcode at the resolution of the old printer (first resolution, 300 dpi in this embodiment) from the application 11. The analyzer 130 analyzes the information for the barcode image at the resolution of the old printer contained in the first image data.

Note that "analyze" as used here means to read the first image data as an image and decode the barcode image.

Based on the result from the analyzer 130, the image data generator 160 generates second image data containing image data for the barcode at the resolution of the new printer 2 (second resolution, 360 dpi in this embodiment). More specifically, the image data generator 160 converts the barcode image at the resolution of the new printer 2 to the print data that will be printed (data for the symbol image) based on output from the analyzer 130. The print data in this embodiment is the image data for the barcode image at the resolution of the new printer 2. More specifically, the image data generator 160 converts the numeric string output from the analyzer 130 to image data for a 360 dpi barcode image.

The printing position controller 150 determines the printing position of the image data for the barcode image (print data) in the image data (second image data). The method of determining this printing position is described below.

When the printing position is specified by the printing position controller 150, the image data generator 160 generates the second image data with the converted print data (barcode image data) at the position specified by the printing position controller 150.

The output unit 170 then sends the image data (second image data) for the new printer 2 generated by the image data generator 160 to the printer 2.

The main functions of the printer (new printer) 2 include a receiving unit 210 and a print unit 220. The receiving unit 210 receives the image data for the new printer 2 sent from the printer driver 12 (output unit 170). The print unit 220 includes the printer control unit 21 and print mechanism 22, and prints the image data for the new printer 2 received by the receiving unit 210.

Figure 4B:
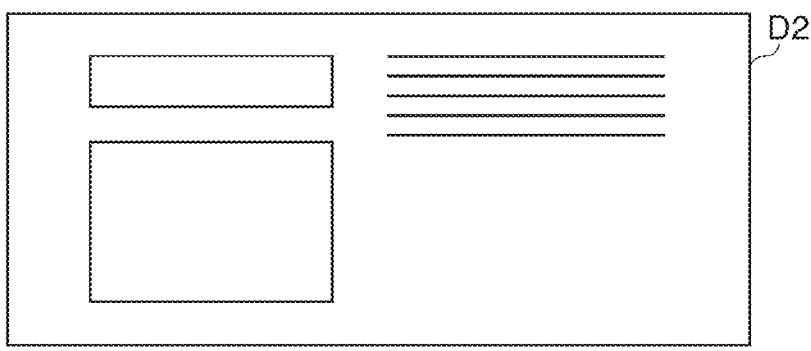

FIG. 4A to FIG. 4D describe determining the printing position of the barcode image. Note that FIG. 4A to FIG. 4D represent the image data to be printed, and do not represent the printout. FIG. 4A shows first image data D1 containing the 300 dpi barcode image (below, first barcode image B1). FIG. 4B shows second image data D2 after enlarging the first image data D1 minus the first barcode image B1. The first image data D1 is enlarged to match the specified paper width because 300 dpi first image data D1 will be printed slightly smaller if printed on a 360 dpi printer 2 without enlargement (because the print area on the specified paper is narrower). Note that the enlargement (scaling) ratio is specified (input) by the user.

Figure 4C:
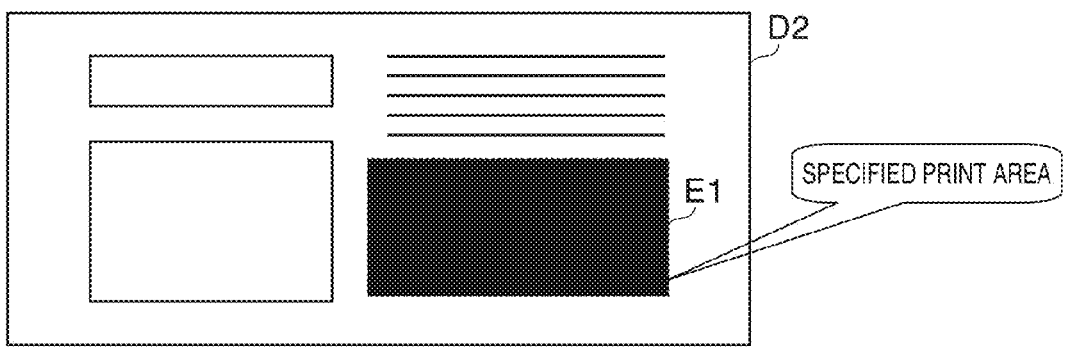

FIG. 4C shows the specified barcode print area E1 in the second image data D2. The print area E1 is specified by, for example, presenting the second image data D2 in FIG. 4B on the display 13, and the user operating the keyboard 14 or mouse 15.

Figure 4D:
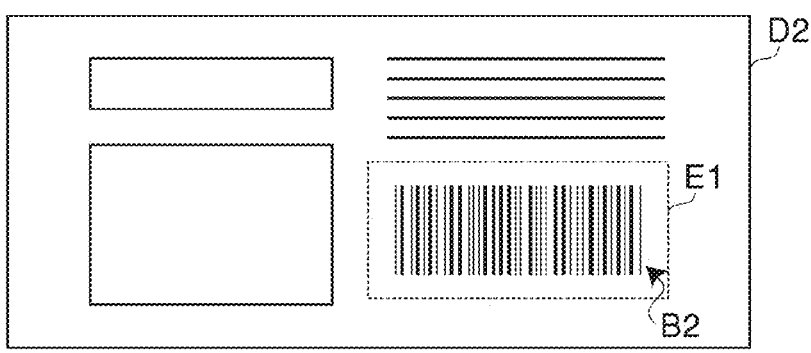

FIG. 4D shows the second image data D2 with the 360 dpi barcode image (below, second barcode image B2) placed in the specified print area E1. The second image data D2 is placed according to a reference position in the print area E1 (such as the center of the print area E1 or any one of the four corners of the print area E1). Note that the second barcode image B2 may be enlarged or reduced according to the size of the print area E1 (horizontal width and/or vertical height). Note that if enlargement or reduction is applied, the dot count for printing each bar of the barcode is preferably adjusted according to the resolution of the barcode after the barcode is converted instead of simply enlarging or reducing the barcode image.

Because the user specifies the print area E1 of the second barcode image B2 in the second image data D2, the appearance of the printout will not be degraded by the position of the barcode shifting, for example, even if the area where the second barcode image B2 is printed is enlarged or reduced according to the scaling ratio specified by the user.

Note that the actual print area E1 is specified in the example shown in FIG. 4C, but a reference position (printing position) could be specified for the print area E1 instead. The second image data D2 is also generated by enlarging the first image data D1 in this example, but enlargement is not necessarily required. If enlargement is not applied, the print area E1 (or printing position) is specified in the second image data D2 after removing the first barcode image B1 from the first image data D1.

Because this first embodiment analyzes the barcode image for the old printer and converts the result to image data for printing a barcode at the resolution of the new printer 2 as described above, the print quality of the barcode image can be maintained without needing to modify the application 11 even when the resolutions of the old and new printer 2 differ.

Furthermore, because the print area E1 of the second barcode image B2 in the second image data D2 can be specified, the appearance of the printout is not degraded even when the print area of the barcode image is enlarged or reduced by an image data scaling process due to differences in resolution, or the actual print size on the paper changes because the entire image is not enlarged or reduced.

The user directly specifies the print area E1 in order to determine the printing position of the second barcode image B2 in the second image data D2 in this first embodiment, but could instead specify the resolution of the old printer (resolution setting unit). This is described below as a first variation of the embodiment.

FIG. 5 describes setting the printing position of the barcode image in this first variation. FIG. 5A shows the first image data D1 containing the first barcode image B1. FIG. 5B shows the second image data D2 obtained by enlarging the first image data D1 according to the specified resolution of the old printer and the resolution of the new printer 2 (the resolution of the printer driver 12). Because the first image data D1 containing the first barcode image B1 is enlarged as is, the print quality of the barcode cannot be assured. As described with reference to FIG. 4 above, the image data is enlarged according to the specified paper width in FIG. 5B, but enlargement could be omitted and the actual print size reduced.

Figure 5A:
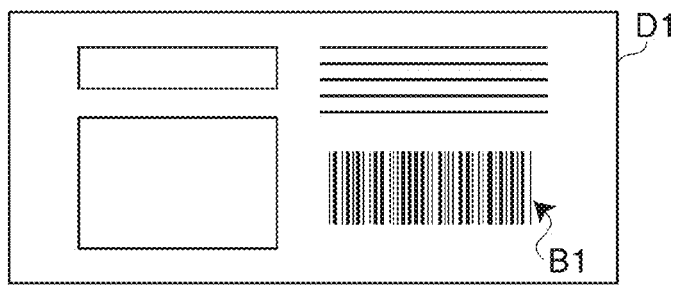
FIGS. 5A, 5B, 5C and 5D describe setting the printing position of a barcode image in a variation of the first embodiment.
Figure 5B:
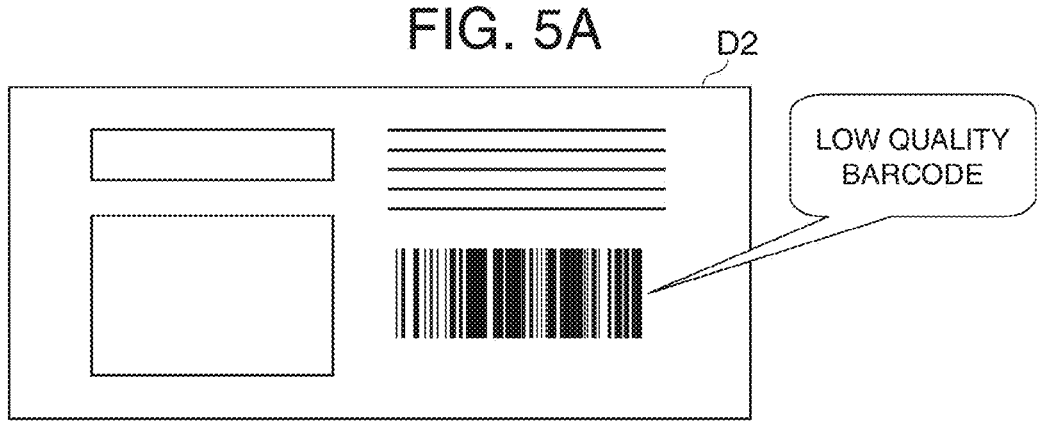
Figure 5C:
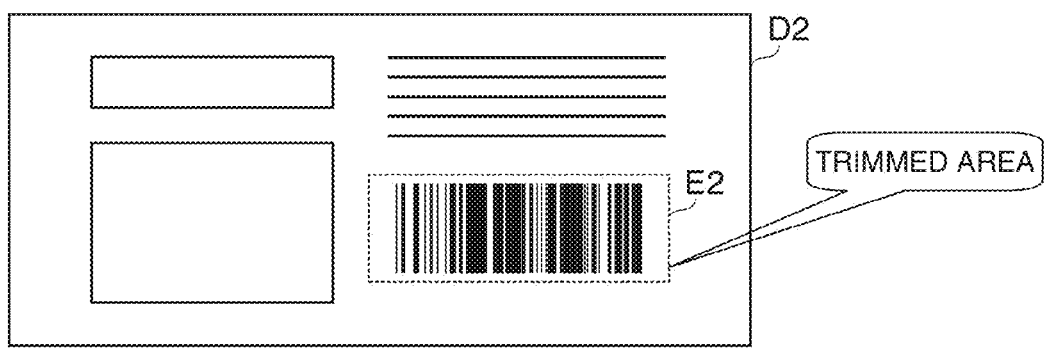
Figure 5D:
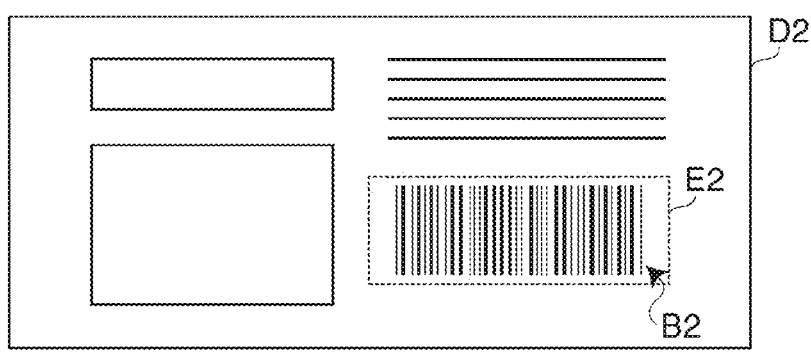

FIG. 5C shows automatically trimming the barcode image area E2 in the second image data D2. FIG. 5D shows placing a separately generated 360 dpi barcode image (second barcode image B2) in the trimmed area (that is, barcode image area E2). The second barcode image B2 is placed according to a reference position in the barcode image area E2 (such as the center of the barcode image area E2, or any one of the four corners of the barcode image area E2). The second barcode image B2 may also be enlarged or reduced according to the size (horizontal width and/or vertical height) of the barcode image area E2. Note that the operations shown in FIG. 5B to FIG. 5D are performed by the printer driver 12 (image data generator 160).

This first variation enables processing the image data accurately according to the difference between the first resolution and second resolution by specifying the first resolution. The second barcode image B2 can also be appropriately placed in the second image data D2 based on the location of the barcode image (that is, the barcode image area E2) after the scaling process.

In a second variation of the first embodiment, the scaling ratio of the first image data D1 can be determined from information related to the size of the printing paper. While not shown in the figures, information related to the paper size is added to (or contained in) the first image data D1 output from the application 11 in this second variation. The printer driver 12 (image data generator 160) determines the scaling ratio of the first image data D1 based on the paper size and the first image data D1. The first image data D1 is then enlarged or reduced at the specified scaling ratio to generate second image data D2 (FIG. 5B), and the position of the second barcode image B2 in the second image data D2 is determined according to the barcode image area E2 after enlargement or reduction (according to the trimming area of the barcode image for which print quality cannot be assured, FIG. 5C). This second variation can thus appropriately enlarge or reduce the image data so that the second image data D2 is printed at a size matching the size of the paper previously set in the first image data D1. Note that the first variation and second variation can also be combined to determine the scaling ratio of the first image data D1 based on the specified first resolution and information related to the paper size.

Embodiment 2

A second embodiment of the invention is described next with reference to FIG. 6. The printer driver 12 handles conversion to the second barcode image B2 in the first embodiment described above, and this embodiment differs by converting to the second barcode image B2 on the printer 2 side. More specifically, the printer 2 in this embodiment can analyze a barcode image print command (barcode print command). The following description of this embodiment focuses on the differences with the first embodiment. Like parts in this and the first embodiment are identified by like reference numerals, and further description thereof is omitted. Variations applicable to like parts in the first embodiment are also applicable to this embodiment.

Figure 6:
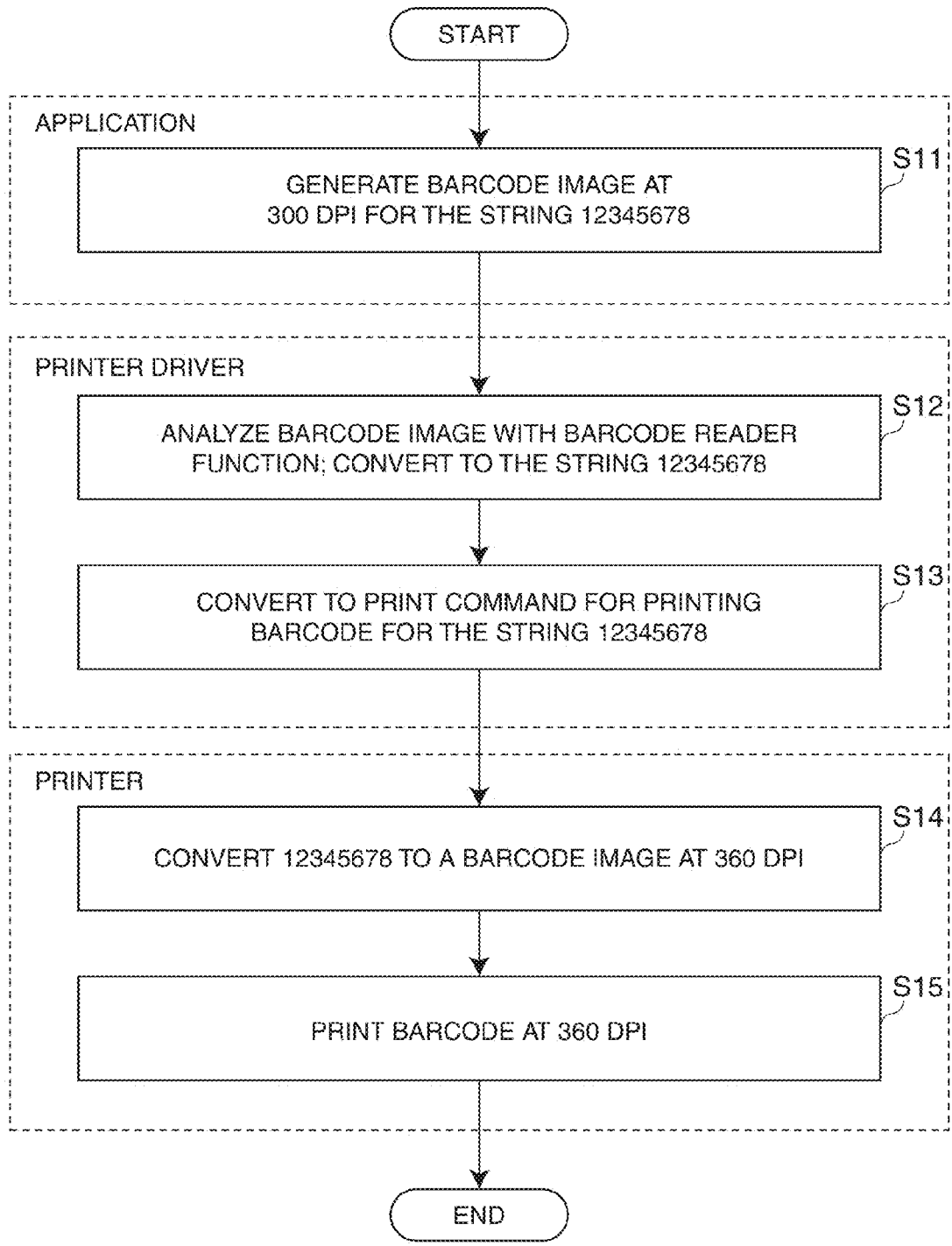
FIG. 6 is a flow chart of a printing process in a second embodiment of the invention.

FIG. 6 is a basic flow chart showing the general flow of operations in the printing process according to the second embodiment of the invention.

The application 11 first generates a first barcode image B1 representing the numeric string 12345678, for example, at 300 dpi (S11). Next, the printer driver 12 analyzes and converts the barcode image to the numbers 12345678 using a barcode reader function (S12). Operation to this point is the same as in the first embodiment. The printer driver 12 then generates a print command for printing a barcode image of the numbers 12345678 (S13, print command generator), and outputs the print command and second image data D2 (the first image data D1, or the result of enlarging the first image data D1) to the printer 2. Based on the print command, the printer 2 converts the string 12345678 to a second barcode image B2 that can be printed at the 360 dpi resolution of the new printer 2 (S14), and prints the second image data D2 containing the second barcode image B2 (S15).

As described above, this second embodiment reduces the processing load on the printer driver 12 because conversion to the second barcode image B2 is handled on the printer 2 side. The printing position can be specified using the printing position controller 150 in this embodiment, too, and the result of this specification is output with the print command for printing a barcode image to the printer 2. Information indicating the location of the barcode image area E2 in the second image data D2 as described in the first and second variations above is also output to the printer 2 with the print command for printing the barcode image.

Embodiment 3

A third embodiment of the invention is described next with reference to FIG. 7. The printer driver 12 analyzes the first barcode image B1 in the first and second embodiments described above, and this embodiment differs by analyzing the first barcode image B1 on the printer 2 side. More specifically, this embodiment renders the image processing device with the printer 2. The following description of this embodiment focuses on the differences with the first embodiment. Variations applicable to like parts in the foregoing embodiments are also applicable to this embodiment.

Figure 7:
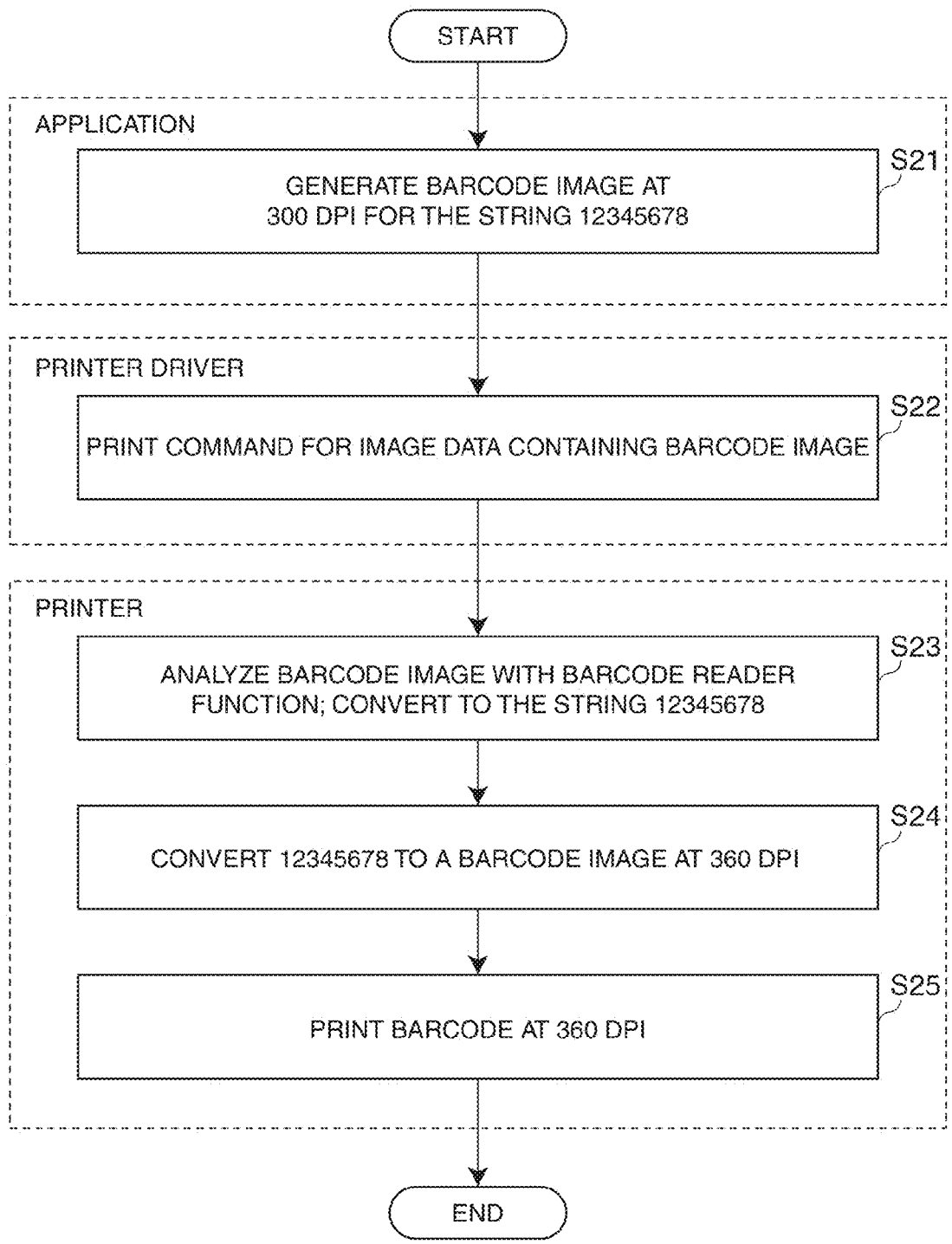
FIG. 7 is a flow chart of a printing process in a third embodiment of the invention.

FIG. 7 is a basic flow chart showing the general flow of operations in the printing process according to the third embodiment of the invention.

The application 11 first generates a first barcode image B1 representing the numeric string 12345678, for example, at 300 dpi (S21). Next, the printer driver 12 outputs first image data D1 containing the first barcode image B1 to the printer 2 (S22). The printer 2 then analyzes and converts the first barcode image B1 to the numeric string 12345678 using a barcode reader function (S23), converts the string 12345678 to a second barcode image B2 that can be printed at the 360 dpi resolution of the new printer 2 (S24), and prints the second image data D2 containing the second barcode image B2 (S25).

As described above, this third embodiment analyzes the first barcode image B1 and converts to the second barcode image B2 on the printer 2 side, and compared with the second embodiment can therefore further reduce the processing load on the printer driver 12. The printing position can be specified using the printing position controller 150 in this embodiment, too. This implementation requires a display means and an input means on the printer 2 side. An input means is also required when variation 1 described above is applied.

Note that while a barcode image is used as an example of a symbol image in the first to third embodiments, the invention can also be applied to other code images, including 2D code images and color barcode images.

Embodiment 4

A fourth embodiment of the invention is described next with reference to FIG. 8 to FIG. 10. This embodiment describes printing image data containing text and/or a logo image with the image processing function of the invention embodied in the printer driver 12. The configuration of the printing system in this embodiment is identical to the first embodiment (FIG. 1), and further detailed description thereof is omitted.

This embodiment anticipates a report application used in a medical facility, or a POS (point-of-sale) application that produces sales receipts, as the application 11. The printer 2 is compatible with 2-inch wide roll paper, prints 752 dots at 360 dpi across the paper width (first direction), and in this embodiment replaces an old printer (not shown in the figure) that prints 512 dots at 180 dpi across the paper width (first direction) on 2.8 inch wide roll paper. Note that the resolution in the paper width direction, and the resolution in the paper feed direction (direction of the paper length) perpendicular to the paper width, are the same in this embodiment. Unless stated otherwise below, "resolution" means the resolution in the paper width direction. The application 11 generates image data (first image data, also referred to below as image data for the old printer) compatible with the paper width and the resolution of the old printer, and this image data contains text and/or a logo image.

The printer driver 12 must execute an image data scaling process to absorb differences between the specifications of the printer 2 and the application 11 (differences in resolution and paper width) in this system. As a result, this embodiment maintains print quality by the printer driver 12 using text analysis and pattern matching to generate image data (second image data, referred to below as image data for the new printer 2) compatible with the resolution of the new printer 2 and the paper width. A logo image denotes an image (an image with different resolution) similar to image data for a logo previously stored in the printer driver 12.

Figure 8:
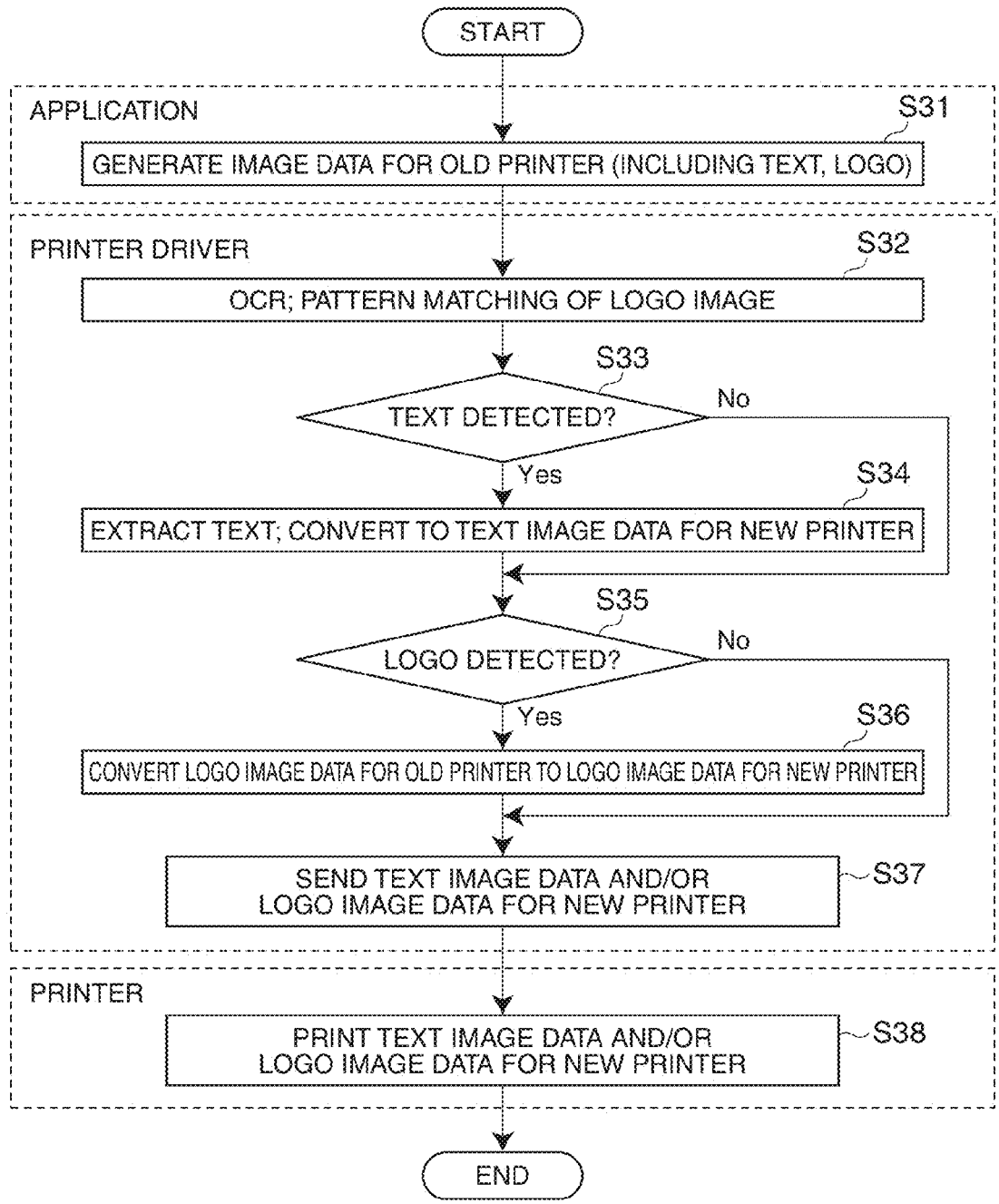
FIG. 8 is a flow chart of a printing process in a fourth embodiment of the invention.
Figure 9:
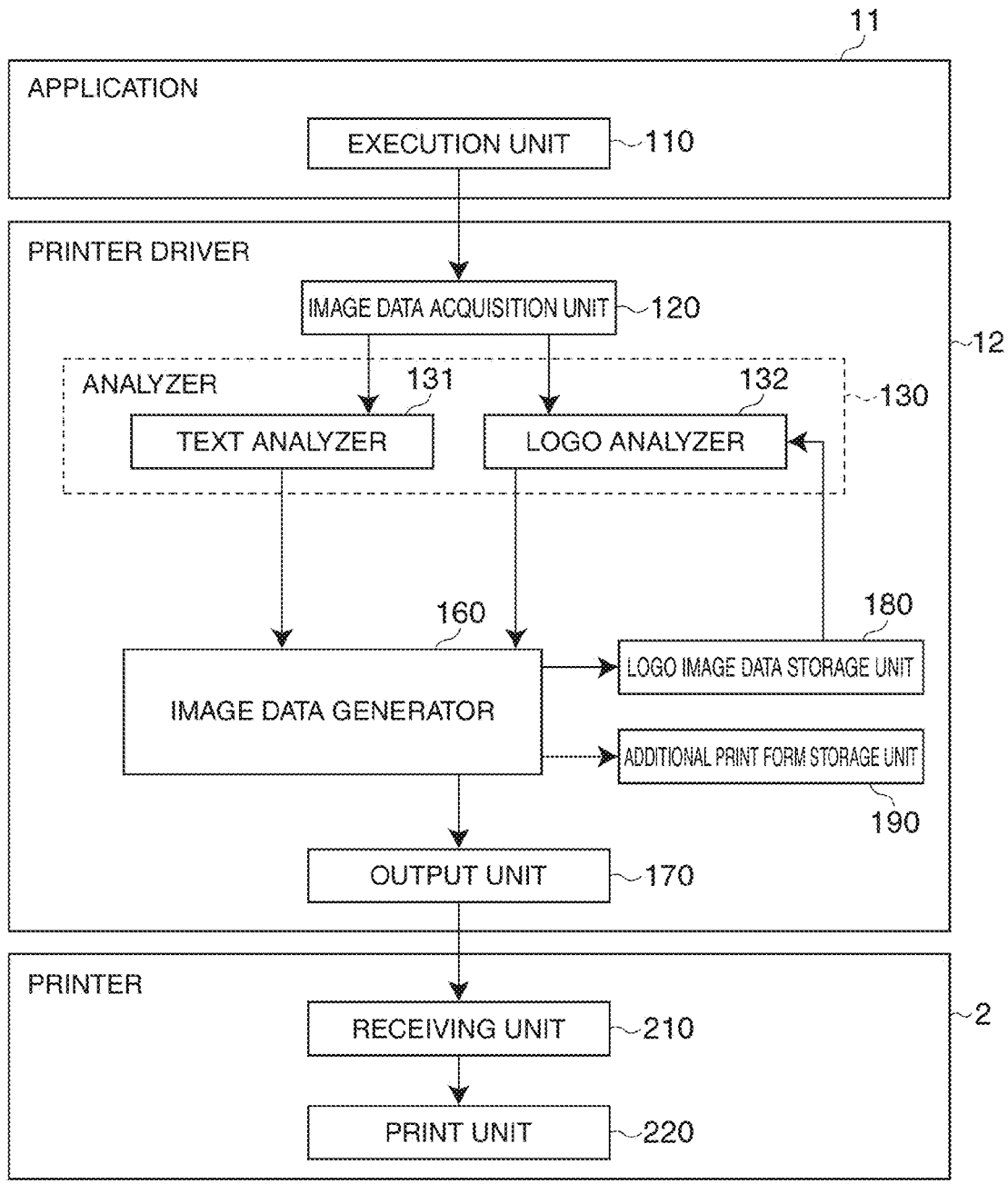
FIG. 9 is a function block diagram of the printing system according to the fourth embodiment of the invention.

FIG. 8 is a basic flow chart of the general flow of the printing process according to the fourth embodiment of the invention.

First, the application 11 generates image data for the old printer (containing text and/or a logo image) (S31). Next, the printer driver 12 analyzes the text using an OCR (optical character recognition) function, and/or detects a logo image by pattern matching (S32). Whether or not text is contained in the image data for the old printer is also determined, and if text is detected (S33 returns YES), the printer driver 12 extracts and converts the text to text image data matching the paper width and resolution of the new printer 2 (S34). If text is not detected (S33 returns NO), step S34 is skipped.

Next, the printer driver 12 determines if a logo image is contained in the image data for the old printer, and if there is (S35 returns YES), replaces the logo image for the old printer with the logo image for the new printer 2 (S36). If a logo image is not found (S35 returns NO), step S36 is skipped.

The printer driver 12 then sends the text image data and/or logo image data for the new printer 2 to the printer 2 (S37).

The printer 2 then prints the text image data and/or logo image received for the new printer 2 on the specified printing paper (S38).

The image data for the old printer generated by the application 11 may also contain information other than text or a logo image. In this event, the image data portion other than the text or logo image is scaled according to the differences in resolution and paper width before and after the printer 2 is replaced. Alternatively, the resolution and paper width of the old printer could be set in the printer driver 12, and the image data scaled according to the differences in the specifications of the old printer and the new printer 2 for which the printer driver 12 was written. For example, when the dot count of the paper width changes from 512 dots to 752 dots as a result of differences in the resolution and paper width of the old and new printers 2, the image data can be enlarged approximately 1.46% widthwise. If only the resolution changes from 180 dpi to 360 dpi, for example, the image data can be simply enlarged two times widthwise. A configuration enabling the user to set the enlargement or reduction ratio is also conceivable.

However, if a barcode image or 2D code image is included in the image data for the old printer and the entire image is simply enlarged or reduced, accurately reading the barcode or 2D code may not be possible when the printout is read with a barcode reader. This embodiment therefore preferably does not enlarge or reduce the area of the barcode image when scaling the image.

The functional configuration of the printing system SY according to the fourth embodiment of the invention is described next with reference to FIG. 9. Note that only the differences with the functional configuration of the first embodiment shown in FIG. 3 are described below.

In addition to the image data acquisition unit 120, analyzer 130, image data generator 160, and output unit 170 described above, the printer driver 12 has a logo image data storage unit 180 and additional print form storage unit 190.

The image data acquisition unit 120 acquires image data for the old printer from the application 11 (execution unit 110). This image data is image data printed on receipt paper (recording paper) with a 512 dot printing width by the old 180 dpi resolution printer.

Figures 10A, 10B:
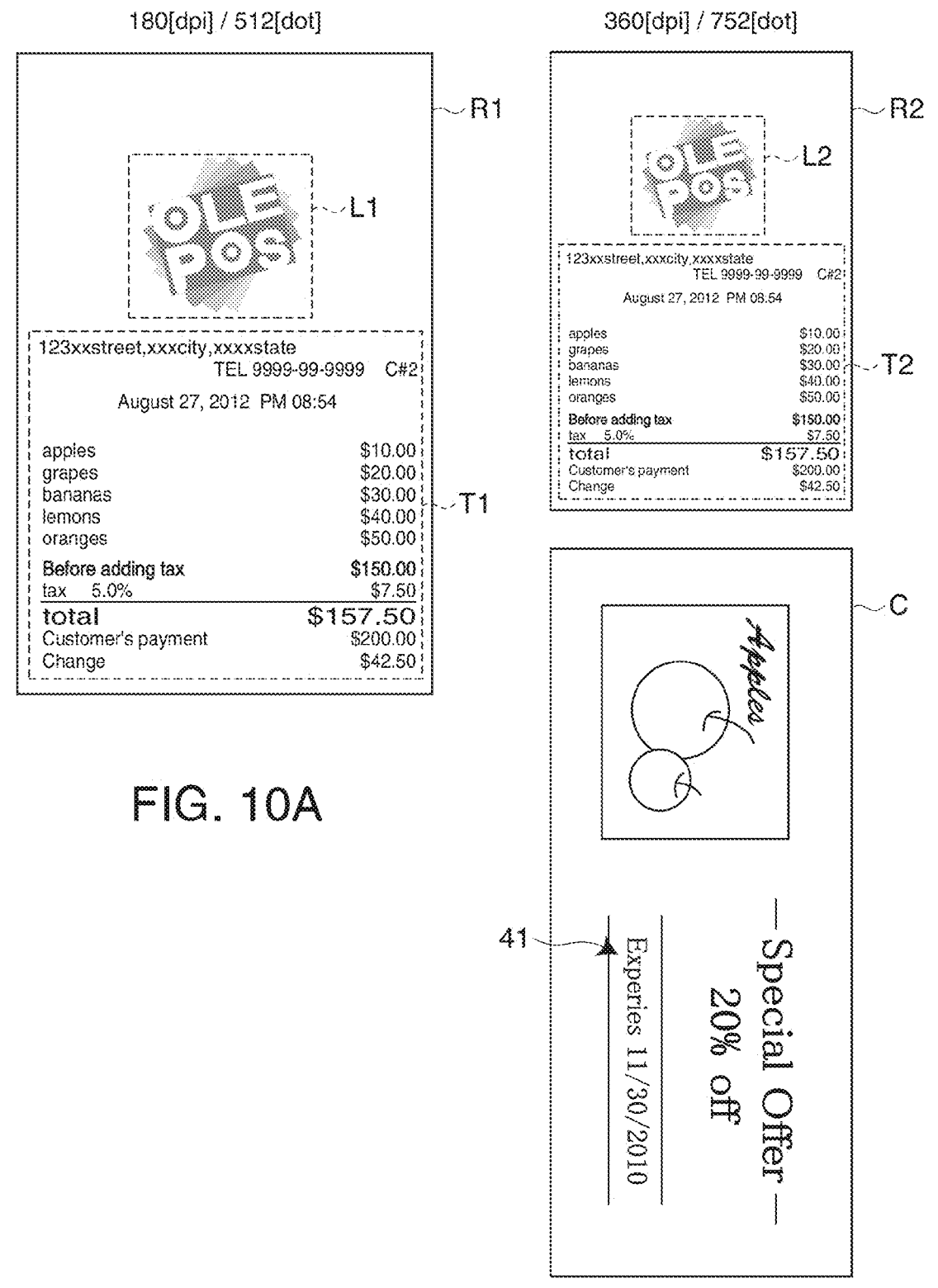

The analyzer 130 includes a text analyzer 131 and logo analyzer 132. The text analyzer 131 analyzes text information contained in the image data for the old printer. "Analyze" as used here includes reading the image data for the old printer as an image, and applying character recognition to the text portion. For example, FIG. 10A shows the printout from an old printer (180 dpi resolution, 512 dot printing width) as an example of the image data R1 for a receipt produced using a POS application as the application 11. Reference numeral L1 in the figure denotes a logo image for the old printer, and T1 denotes a text image for the old printer. The text analyzer 131 reads the image data R1 for the receipt as an image, and applies character recognition to extract text from the text image T1.

The logo analyzer 132 determines if there is a logo image in the image data for the old printer. More specifically, the logo analyzer 132 determines if there is a logo image L1 at the resolution (180 dpi) of the old printer. "Analyze" as used here includes reading the image data for the old printer (image data R1 for a receipt), and applying pattern matching using the logo image for the new printer 2 stored in the logo image data storage unit 180. For example, FIG. 10B shows examples of image data R2 and C for a receipt and coupon produced by the new printer 2 (with 360 dpi resolution, and 752 dot printing width). The logo analyzer 132 uses the logo image L2 shown in FIG. 10B to determine if logo image L1 is contained in the image data R1 of the receipt received from the application 11. The coupon is described below.

The logo image data storage unit 180 stores logo image data for the new printer 2 as described above. The additional print form storage unit 190 stores a print form for a coupon. Note that the print form stored in the additional print form storage unit 190 in this embodiment is image data, including a picture and text (not including text 41 for the expiration date) printed on the coupon as shown in FIG. 10B, matching the specifications of the new printer 2.

The image data generator 160 generates image data R2 (second image data) and image data C (additional image data) for the receipt shown in FIG. 10B. When the receipt image data R2 is image data printed at the dot count of a paper width (second width) different from the dot count of the paper width (first width) used by the old printer, the image data generator 160 generates the receipt image data R2 and coupon image data C at the dot count (752 dots) of the paper width used in the new printer 2. When generating the coupon image data C, the coupon image data C can be generated as a separate image so that the printer 2 cuts the paper after printing a receipt and then prints the coupon, or as a single image so that the receipt and coupon are printed together on a single piece of paper. If the printer 2 has a partial-cut function, the image data could be generated so that a partial cut is made between the receipt and coupon.

The image data generator 160 first converts the result of analysis by the text analyzer 131 to text information for the new printer 2. The text information produced in this embodiment is text image data T2 matching the specifications of the new printer 2 (360 dpi, 752 dot print width). When a logo image L1 at the resolution of the old printer is detected in the image data for the old printer by the logo analyzer 132, the old logo image L1 is replaced with the logo image L2 matching the specifications of the new printer 2.

When the text analyzer 131 detects specific text (a keyword) in the text image T1, the image data generator 160 generates and adds image data C for a related coupon (image data matching the specifications of the new printer 2) to the receipt image data R2. FIG. 10B shows an example of detecting the keyword "apples" triggering generating a coupon for apples. When generating the coupon image data C, the image data generator 160 determines the expiration date based on the current date and time, and inserts text 41 representing the expiration date in the print form read from the additional print form storage unit 190.

Note that numerous print forms related to plural keywords or products could be stored in the additional print form storage unit 190. When a customer ID can be extracted from the result of analyzing the text image data T2, a customer database not shown could be referenced using the customer ID as a search key, and a special birthday coupon printed if the transaction date matches the customer's birthday, for example. The customer database could also be referenced to produce coupons for customers based on the customer's sex, age, purchasing frequency, or other parameter.

The output unit 170 then sends the image data for the new printer 2 produced by the image data generator 160 to the printer 2.

As described above, this fourth embodiment of the invention uses OCR technology to analyze text image data for the old printer, converts the extracted text to text image data T2 for the new printer 2, and can therefore maintain the print quality of text without needing to change the application 11 even when the resolution of the old and new printer 2 differ and image scaling is required. More specifically, by converting the result of text analysis to image data matching the resolution of the new printer 2 instead of simply scaling the image data, problems such as the text becoming distorted or unreadable can be eliminated. Preventing a loss of text print quality is not limited to when the printer resolution changes, and is also possible when the length or dot count of the width of the paper used in the old and new printer 2 differ.

Furthermore, because a logo image L1 contained in receipt image data R1 is replaced with a logo image L2 for the new printer 2, print quality can also be maintained in the logo image as well as text.

Furthermore, because coupon image data C (third image data) is generated based on the result of analysis by the text analyzer 131, a coupon printing function can be added without changing the application 11.

Note, further, that the foregoing fourth embodiment describes generating coupon image data as the third image data, but the invention is not limited to coupons and may add data for a voucher, product warranty, certificate of quality, advertising, or other object based on the result of analysis by the text analyzer 131.

Logo image data and additional print forms are stored for the new printer 2 in the logo image data storage unit 180 and additional print form storage unit 190 above, but a configuration that stores logo image data and print forms at the highest possible resolution, and reduces the image data according to the specifications (resolution and paper width)

of the new printer 2, is also conceivable. This embodiment enables a printer driver 12 compatible with various specifications to use common logo image data and additional print forms. A configuration that stores logo image data and print forms for color printing is also conceivable to enable replacing a monochrome printer with a color printer 2. In this configuration, a monochrome printer driver 12 converts color data to monochrome data.

Embodiment 5

A fifth embodiment of the invention is described next with reference to FIG. 11. In the fourth embodiment described above the printer driver 12 converts text for an old printer to text image data for the new printer 2. This embodiment differs by converting text for the old printer to a text print command instead of a text image. More specifically, the printer 2 according to this embodiment of the invention can interpret text print commands. The differences between the fourth and fifth embodiments are described below. Variations applicable to like parts in the foregoing embodiments are also applicable to this embodiment.

Figure 11:
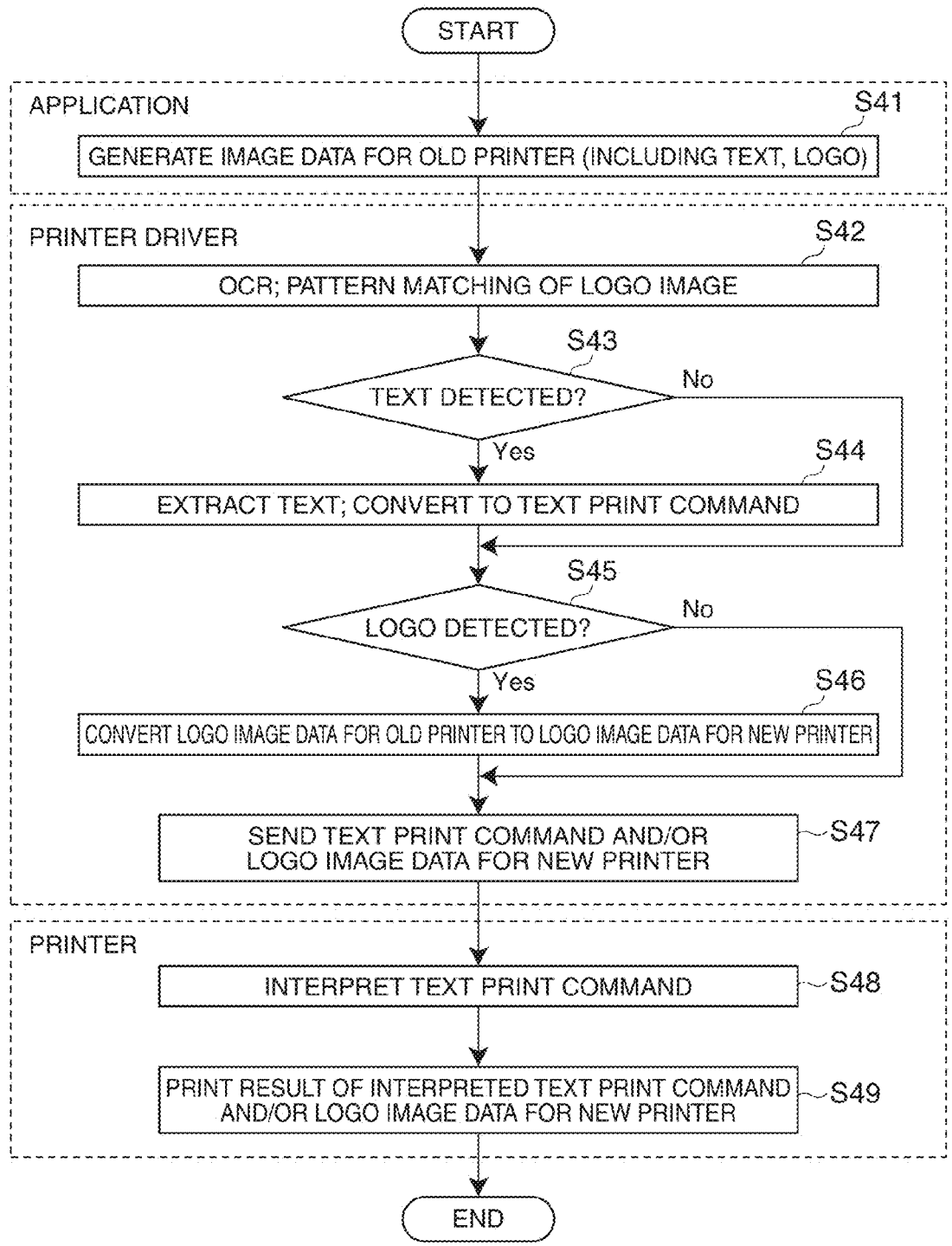
FIG. 11 is a flow chart of a printing process in a fifth embodiment of the invention.

FIG. 11 is a basic flow chart of the general flow of the printing process according to the fifth embodiment of the invention.

First, the application 11 generates image data for the old printer (S41). Next, the printer driver 12 applies OCR and pattern matching (S42). Operation to this point is the same as in the fourth embodiment.

Next, the printer driver 12 determines if text is contained in the image data for the old printer, and if text is detected (S43 returns YES), extracts and converts the text to a text print command (S44, print command generating unit). A text print command is a print command that can be interpreted by the printer 2. The font size can also be specified according to the resolution and paper width of the new printer 2. Instead of the resolution and paper width of the new printer 2, an appropriate font size could be specified based on the number of characters that can be printed across the paper width (line direction). If text is not detected (S43 returns NO), step S44 is skipped.

Next, the printer driver 12 determines if a logo image is contained in the image data for the old printer, and if there is (S45 returns YES), replaces the logo image for the old printer with the logo image for the new printer 2 (S46). If a logo image is not found (S45 returns NO), step S46 is skipped.

The printer driver 12 then sends the text print command and/or logo image data for the new printer 2 to the printer 2 (S47).

The printer 2 then interprets the received text print command (S48), and prints the interpreted text and/or logo image received for the new printer 2 on the specified printing paper (S49).

As described above, the printer driver 12 in the fifth embodiment of the invention converts text information contained in the image data for the old printer to a text print command instead of a text image, and can therefore reduce the amount of data sent to the printer 2 compared with the fourth embodiment.

Further alternatively, the fourth and fifth embodiments could be combined and the user enabled to desirably select whether to convert extracted text to text image data or a text print command.

Embodiment 6

A sixth embodiment of the invention is described next with reference to FIG. 12. In the fourth and fifth embodiments above the printer driver 12 handles OCR analysis and pattern matching. This embodiment differs by the printer 2 handling these tasks. More specifically, the image processing device of the invention is embodied in the printer 2 in this embodiment. The differences with the fourth and fifth embodiments are described below. Variations applicable to like parts in the foregoing embodiments are also applicable to this embodiment.

Figure 12:
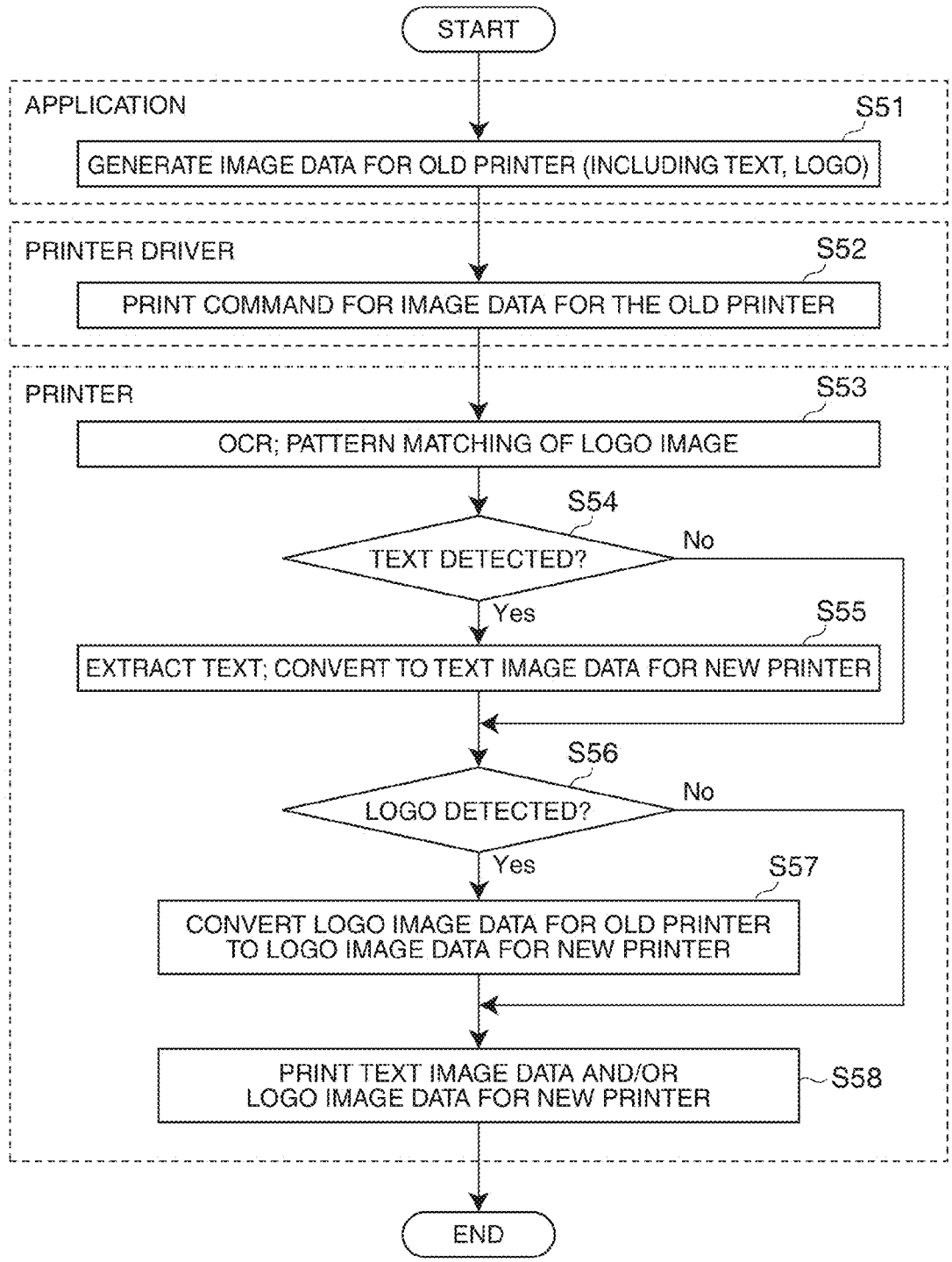
FIG. 12 is a flow chart of a printing process in a sixth embodiment of the invention.

FIG. 12 is a basic flow chart of the general flow of the printing process according to the sixth embodiment of the invention.

First, the application 11 generates image data for the old printer (S51). Next, the printer driver 12 sends image data for the old printer to the printer 2 (S52). The printer 2 then acquires the image data for the old printer from the printer driver 12, and applies OCR analysis and logo image pattern matching (S53). Whether or not text is contained in the image data for the old printer is also determined, and if text is detected (S54 returns YES), the printer 2 extracts and converts the text to text image data for the new printer 2 (S55). If text is not detected (S54 returns NO), step S55 is skipped.

Next, the printer 2 determines if a logo image is contained in the image data for the old printer, and if there is (S56 returns YES), replaces the logo image for the old printer with the logo image for the new printer 2 (S57). If a logo image is not found (S56 returns NO), step S57 is skipped.

The printer 2 then prints the text image data and/or logo image received for the new printer 2 on the specified printing paper (S58).

This sixth embodiment can reduce the processing load on the printer driver 12 because OCR analysis and pattern matching are performed on the printer 2 side. The effect of the invention can also be achieved in configurations using a driverless PC 1 (such as when the PC 1 is used in a cloud computing environment).

The fourth to sixth embodiments describe implementations in which the resolution and paper width of the old and new printer 2 differ, but can also be applied to implementations in which only the resolution or the paper width (dot count across on the paper width, or the paper width) is different.

The invention is described with reference to first to sixth embodiments above, but the invention is not so limited and can also be embodied as a program rendering elements of the printer driver 12 or printer 2 described above. This program can also be provided stored on a recording medium (including CD-ROM and flash memory media). More specifically, a program that causes a computer to function as elements of the printer driver 12 or printer 2 described above, and a recording medium storing this program, are also included in the scope of the present invention.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. An image processing device, comprising:
an image data acquisition unit that acquires first image data including a symbol image of a first resolution;
an analyzer that analyzes the symbol image;
an image data generating unit that generates second image data containing a symbol image of a second resolution based on the result of analysis by the analyzer; and
a printing position controller that specifies a printing position of the symbol image of the second resolution in the second image data;

the image data generating unit generating the second image data according to the printing position specified by the printing position controller.

2. The image processing device of claim 1, further comprising:
a print command generating unit configured to generate a print command to print the symbol image of the second resolution based on the result of analysis by the analyzer.

3. The image processing device of claim 1, further comprising:
a resolution setting unit where the first resolution is set; wherein
the image data generating unit is configured to enlarge or reduce the first image data based on the second resolution and the first resolution set by the resolution setting unit, and
the printing position controller is configured to set the printing position for the symbol image of the second resolution in the second image data based on the location of the symbol image of the first resolution in the first image data that has been enlarged or reduced.

4. The image processing device of claim 3, wherein:
the first image data contains information related to the printing paper size; and
the image data generating unit is configured to enlarge or reduce the first image data based on the information related to the printing paper size.

5. The image processing device of claim 1, further comprising:
a logo image data storage unit that stores logo image data of a different resolution than the first resolution; and
a logo analyzer configured to determine whether logo image data is contained in the first image data;
wherein, when the logo analyzer determines that logo image data is contained in the first image data, the image data generating unit is configured to
replace the logo image data in the first image data with the logo image data stored in the logo image data storage unit, and
generate the second image data.

6. The image processing device of claim 5, wherein:
the image data generating unit is configured to
convert the logo image data stored in the logo image data storage unit to logo image data of the second resolution, and
replace the logo image data in the first image data with the logo image data of the second resolution.

7. The image processing device of claim 1, wherein:
the first image data acquired by the image data acquisition unit has the first resolution in a first direction and is to be printed on recording paper of a first width in the first direction; and
when the second image data generated by the image data generating unit is to be printed on recording paper of a second width that differs from the first width in the first direction, the image data generating unit is configured to generate the second image data based on the second width.

8. The image processing device of claim 1, wherein:
the first image data contains text information;
the analyzer is configured to analyze the text information; and
the image data generating unit is configured to generate the second image data containing the text information of the second resolution.

9. The image processing device of claim 8, wherein:
the print command generating unit is configured to generate a print command that prints text corresponding to the text information of the second resolution based on the result of analyzing the text information by the analyzer.

10. The image processing device of claim 8, wherein:
the image data generating unit is configured to generate third image data that is different from the second image data based on the result of analyzing the text information by the analyzer.

11. An image processing system, comprising:
an image data output device configured to output first image data including a symbol image of a first resolution; and
an image processing device including:
an image data acquisition unit configured to acquire the first image data,
an analyzer configured to analyze the symbol image,
an image data generating unit configured to generate second image data containing the symbol image of a second resolution based on the result of analysis by the analyzer,
an output unit configured to transmit the second image data generated by the image data generating unit, and
a printing position controller configured to specify a printing position of the symbol image of the second resolution in the second image data,
wherein the image data generating unit is configured to generate the second image data according to the printing position specified by the printing position controller.

12. The image processing system of claim 11, further comprising:
a printer having
a receiving unit configured to receive the second image data transmitted from the output unit of the image processing device,
a printhead configured to print at the second resolution, and
a control unit configured to control the printhead to print the second image data received by the receiving unit at the second resolution.

13. The image processing system of claim 11, wherein:
the first image data contains text information;
the analyzer of the image processing device is configured to analyze the text information; and
the image data generating unit of the image processing device is configured to generate the second image data containing the text information of the second resolution.

14. A printing method, comprising:
generating first image data including a symbol image of a first resolution;
analyzing the symbol image contained in the generated first image data;
generating second image data containing a symbol image of a second resolution based on the result of said analyzing;
specifying a printing position of the symbol image of the second resolution in the second image data; and
printing the generated second image data at the second resolution,
wherein, in said generating the second image data, the second image data is generated according to the printing position specified at said specifying the printing position.

15. The printing method of claim 14, wherein
the first image data contains text information;
the printing method further comprises analyzing the text information; and in said generating the second image data, the second image data is generated to contain the text information of the second resolution.

* * * * *